(12) United States Patent
Wagner et al.

(10) Patent No.: US 8,742,911 B2
(45) Date of Patent: Jun. 3, 2014

(54) METHOD FOR MONITORING THE LOAD OF VEHICLE TIRES

(75) Inventors: Markus Wagner, Ludwigsburg (DE); Hendrik Troeger, Filderstadt (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 647 days.

(21) Appl. No.: 13/020,159

(22) Filed: Feb. 3, 2011

(65) Prior Publication Data

US 2011/0193696 A1 Aug. 11, 2011

(30) Foreign Application Priority Data

Feb. 5, 2010 (DE) .......................... 10 2010 007 008

(51) Int. Cl.
*B60Q 1/00* (2006.01)
(52) U.S. Cl.
USPC ........... 340/438; 340/440; 340/442; 340/443; 340/444; 340/679; 701/124; 702/173; 702/174; 702/175
(58) Field of Classification Search
USPC .................. 340/440, 442–448, 679; 701/124; 702/175, 138–142, 41–43, 98
See application file for complete search history.

(56) References Cited

U.S. PATENT DOCUMENTS

| | | | | |
|---|---|---|---|---|
| 6,980,925 | B2 * | 12/2005 | Zheng et al. .................. | 702/175 |
| 7,536,903 | B2 * | 5/2009 | Schillinger et al. .......... | 73/146.5 |
| 2003/0058118 | A1 * | 3/2003 | Wilson .......................... | 340/679 |
| 2005/0075825 | A1 * | 4/2005 | Zheng et al. .................. | 702/140 |
| 2005/0110623 | A1 | 5/2005 | Schulze et al. | |
| 2006/0025897 | A1 * | 2/2006 | Shostak et al. .................... | 701/1 |
| 2007/0069879 | A1 | 3/2007 | Kuchler | |
| 2007/0240501 | A1 | 10/2007 | Mancosu et al. | |

FOREIGN PATENT DOCUMENTS

| | | |
|---|---|---|
| DE | 10 2007 004 042 A1 | 8/2007 |
| DE | 10 2006 033 951 A1 | 10/2007 |
| DE | 10 2007 023 069 A1 | 11/2008 |

\* cited by examiner

*Primary Examiner* — Daryl Pope
(74) *Attorney, Agent, or Firm* — Hackler Daghighian & Martino

(57) ABSTRACT

The invention relates to a method for monitoring the load of vehicle tires which are each contacting a pavement with a circumferential section during travel, by means of monitoring devices (4) which are mounted to the tire (1) and contain a transmitter and a generator which is driven by the flexion of the tire (1), said flexion occurring during vehicle operation, wherein the generator generates a first voltage pulse each time it reaches the beginning of the circumferential section of the tire (1), which is contacting the pavement, and generates a second voltage pulse each time it reaches the end of the circumferential section of the tire (1), which is contacting the pavement, the time intervals ($t_1$) between first and second voltage pulses are measured, the time intervals ($t_1$) or a value calculated therefrom are/is compared with a reference value, and a warning signal is generated if a difference detected in this comparison exceeds a predefined value.

10 Claims, 1 Drawing Sheet

METHOD FOR MONITORING THE LOAD OF VEHICLE TIRES

The invention relates to a method for monitoring the load of vehicle tires.

Any excessive load of vehicle tires leads to an increased flexion of the tire. The increased flexing work results in an increased fuel consumption of the vehicle and in a higher abrasion of the tires. An increased load of vehicle tires can, in particular, be the result of a one-sided or uneven loading of a vehicle, with the result that tires on the left-hand side of the vehicle are under a considerably heavier load than tires on the right-hand side of the vehicle or, vice versa, tires on the right-hand side of the vehicle are under a considerably heavier load than tires on the left-hand side of the vehicle.

The object of the invention, therefore, is to show a way of reliably recognizing an excessive load of vehicle tires.

SUMMARY OF THE INVENTION

During travel, vehicle tires are each contacting the pavement with a circumferential section. As it rolls during travel, the tire is deformed both at the beginning and at the end of the contacting circumferential section. Usually, the length of this circumferential section is referred to as tire contact area or tire contact length and is the greater, the higher the load of the tire or the lower the tire inflation pressure.

In a method according to the invention, use is made of a monitoring device which is mounted to the tire and contains a transmitter and a signaling device, wherein the signaling device generates a first signal each time it reaches the beginning of the circumferential section of the tire, which is contacting the pavement, and generates a second signal each time it reaches the end of the circumferential section of the tire, which is contacting the pavement.

Such a signaling device can, for example, be an acceleration sensor such as it is usually installed in many tire inflation pressure monitoring devices. If an acceleration sensor mounted to the tire reaches the section of the tire, which is contacting on the pavement, the path of the acceleration sensor, which extended along a circular arc beforehand, changes and passes into a flattened section which corresponds to the tire contact length. This deflection from the movement extending along a circular arc leads to a temporary reduction in the distance of the sensor from the axis of rotation of the wheel. This results in a change of the forces acting on the acceleration sensor and, therefore, results in a signal of the acceleration sensor.

Since the sensor has a reduced distance from the axis of rotation of the wheel while passing the tire contact length, the centrifugal acceleration is then temporarily reduced. In a method according to the invention, the reduction in the centrifugal acceleration can, therefore, be used as a first signal and, after the tire contact length has been passed, the increase in the centrifugal acceleration can be used as a second signal.

In addition, the path of the acceleration sensor, which is flattened while the tire contact length is passed, also leads to a change in the path acceleration. To be specific, the tire contact length is somewhat shorter than the length of a circular arc that would, during this time, be passed by the sensor in case of a tire that would not be flattened by the contact with the pavement. That is why the tangential acceleration noticeably changes when the sensor reaches the beginning or the end of the tire contact length.

The signaling device used can also be a generator which is driven by the flexion of the tire, said flexion occurring during vehicle operation, and, therefore, generates a voltage pulse as a signal each time the tire section carrying it is deformed. This is the case exactly when the generator reaches the beginning or the end of the circumferential section of the tire, which is contacting the pavement. Particularly suitable are piezo-electric generators. Such a generator can, for example, be adhered to the inner side of the tire in the form of a small plate or a foil. Such a piezo-electric generator is deformed while the tire is being flexed, with the result that a voltage pulse is generated.

During travel, the signaling device, therefore, generates first signals or voltage pulses whenever it reaches the beginning of the circumferential section that is contacting the pavement and second signals or voltage pulses whenever it reaches the end of the circumferential section that is contacting the pavement. The time interval between a first signal and a second signal is relatively short because the circumferential section of the tire, which is contacting the pavement, represents only a small part of the total circumference. In contrast, the time interval between a second signal and a first signal is relatively long because the tire must almost make a full revolution during this time in order to ensure that the signal generator again returns from the end of the circumferential section that is contacting the pavement to the beginning of the contacting circumferential section.

With unchanging driving speed, the time interval between first and second signals is proportional to the length of the circumferential section of a tire, which is contacting the pavement. With unchanging speed, the time interval between second and first signals is, accordingly, the shorter, the greater the tire contact length. It is, therefore, possible to determine a critical tire load by comparing the first or the second time intervals with a reference value.

The reference value for a tire can, for example, be defined in relation to the time intervals between first and second signals of a tire on the opposite side of the vehicle. In the simplest case, the time interval between first and second signals of the tire mounted opposite on the other side of the vehicle can be defined as reference value for a tire; that means that, for example, the time interval between first and second signals of the left-hand front-wheel tire can be used as reference value for the right-hand front-wheel tire, and vice versa.

With an evenly loaded vehicle, the tire contact length on the left-hand and the right-hand sides of the vehicle is of equal size, at least as long as the vehicle is driving straight ahead. If the time intervals between first and second signals differ from each other in case of tires in opposite arrangement on different sides of the vehicle, this indicates an uneven loading of the vehicle. If the differences between the time intervals of tires in opposite arrangement are different from each other by more than a predefined threshold value, a warning signal can be generated, said warning signal calling the attention of the driver of the vehicle to this fact. It is also possible to send the warning signal to a dynamic drive control system, for example, an ESC or ESP system, with the result that the uneven loading can be taken into consideration in critical driving situations.

An advantageous refinement of the invention provides that the reference value is defined in relation to the vehicle speed. To be specific, the time interval between first and second pulses is proportional to the tire contact length with a given vehicle speed. It is, for example, possible to approximately calculate the tire contact length L as $L = 2\pi r\, t_1/T$ from the ratio of the time intervals $t_1$ between first and second signals and the time T required for a full revolution of the tire, with r being the radius of the tire.

With a target value $L_{target}$ of the tire contact length, it is, therefore, possible to define a reference value R for the time intervals $t_1$ between first and second signals, for example, as $R=L_{target} T/2 \pi r$ in relation to the speed.

If the reference value is defined in relation to the vehicle speed, for example, by selecting the reference value as a value that is reciprocally proportional to the vehicle speed, it is, therefore, possible to use the difference of the time intervals $t_1$ between first and second signals from the reference value R as a measure for the tire contact length L and to make this difference available, for example, to a dynamic drive control system. If the tire contact length exceeds a predefined threshold value, this indicates an overload of the tire, which can be caused by an overload of the vehicle or by an insufficient tire inflation pressure. That is why, preferably, a warning signal is generated if the tire contact length exceeds a predefined threshold value. This warning signal can, for example, be a visual or an audible warning signal to call a driver's attention to the overload of a tire.

In order to define the reference value, the speed can, advantageously, be determined by also measuring the time intervals between second and first signals. To be specific, the sum total from the time interval $t_1$ between a first signal and a second signal and the time interval $t_2$ between the second signal and the subsequent first signal corresponds to the time T for a full revolution of a tire. The reference value can, therefore, be defined in relation to the vehicle speed, for example, by multiplying a predefined constant by the time interval between a second signal and a first signal. Another possibility is, for example, to define the reference value as the product of a constant and the sum total of the time interval between a first signal and a second signal and the time interval between the second signal and the next first signal.

A possibility that is equivalent to defining the reference value in relation to the speed is to calculate a quotient using first and second time intervals, for example, $t_1/t_2$ or $t_1/(t_1+t_2)$ and to compare this value with a constant that is predefined as reference value.

By applying the method according to the invention, it is, advantageously, possible to not only determine an excessive load of a tire, i.e., an excessively great tire contact length, but also a lifting off of a tire from the pavement. By evaluating the difference of the time intervals from the reference value, it is, therefore, also preferably checked whether a tire lifts off from the pavement; if it is detected that a tire lifts off, this fact is sent to a dynamic drive control system with a warning signal. That is to say that, if the signals from the tires on one side of the vehicle fail to arrive although successive signals are still sent from the tires on the other side of the vehicle, it can be concluded that the tires with the signals that fail to arrive do not have any contact with the pavement any longer. In such situations, an accident can be prevented or the consequences of an accident be mitigated by a dynamic drive control system taking appropriate action.

The tire inflation pressure monitoring device used for a method according to the invention can be a tire inflation pressure monitoring device with a pressure sensor for measuring the tire inflation pressure. Prior art tire inflation pressure monitoring devices are known, for example, from DE 10 2004 026 035 B4 or DE 102 17 239 A1.

It is, however, also possible to apply the method according to the invention to implement a tire inflation pressure monitoring device that does not contain any pressure sensor. To achieve this, the tire contact length is determined by evaluating the time intervals between successive signals and comparing the tire contact length with a threshold value. To be specific, an excessive tire contact length also is a sign of an insufficient tire inflation pressure. The present invention, therefore, also relates to a method for determining the tire contact length by means of a monitoring device which is mounted to the tire and contains a transmitter and a signaling device which generates a first signal each time it reaches the beginning of the circumferential section of the tire, which is contacting the pavement, and generates a second signal each time it reaches the end of the circumferential section of the tire, which is contacting the pavement, wherein the time intervals between successive signals are measured and the tire contact length is calculated therefrom. Preferably, the tire contact length is compared with a reference value, with a warning signal being generated if a threshold value is exceeded.

Tire inflation pressure monitoring devices with a generator which is driven by the tire flexion occurring during vehicle operation, advantageously, do not require any battery and, therefore, have a fundamentally unlimited service life. Preferably, such tire inflation pressure monitoring devices have an energy storage device, for example, a capacitor or an electric accumulator, which can be charged during accelerated travel and, therefore, allows a more intensive measuring and transmitting activity during decelerated travel or, temporarily, even with the vehicle being at standstill.

With use being made of a tire inflation pressure monitoring device, the method according to the invention can be implemented without any additional hardware expenditure and, therefore, in a cost-effective manner. It is, in particular, also to advantage that the reference value can be defined in relation to the tire inflation pressure if use is made of tire inflation pressure monitoring devices.

The comparison of the time intervals between first and second signals with a reference value can be made in the monitoring device. It is, however, preferred that the monitoring device transmits information about the time intervals and the comparison is made by a central unit of the vehicle, said central unit receiving the radio signals of the monitoring device.

In order to determine the vehicle speed from the first and second time intervals, the tire diameter is required, said tire diameter, often, being known only approximately. An inaccuracy can also be the result of a change in the vehicle speed between successive signals. This can be counteracted by using at least two signaling devices for each wheel, said signaling devices being arranged spaced apart from each other in circumferential direction. The signaling devices will then generate first and second signals in a time-delayed manner. The vehicle speed and the tire contact length can be determined with increased precision and without knowing the tire diameter by evaluating the time delay.

For this reason, an advantageous further development of the invention provides that use is made of a second signaling device which generates a first signal each time it reaches the beginning of the circumferential section of the tire, which is contacting on the pavement, and generates a second signal each time it reaches the end of the circumferential section of the tire, which is bearing on the pavement, and the time delay between signals of the first signaling device and signals of the second signaling device is evaluated and used to define the reference value or to calculate the tire contact length.

Preferably, the two signaling devices are part of a single monitoring device. Advantageously, a generator can, for example, be arranged at ends of the monitoring device, said ends being disposed on opposite sides in circumferential direction.

Preferably, the two signaling devices are, in addition, used to determine the direction of rotation of the wheel. This information can be used to distinguish between right-hand and left-hand wheels and, therefore, to allocate the wheel electronic systems to appropriate tire positions on a vehicle.

BRIEF DESCRIPTION OF THE DRAWINGS

Further details and advantages of a method according to the invention are illustrated by means of exemplary embodiments and with reference being made to the accompanying drawing.

DETAILED DESCRIPTION

Figure 1:
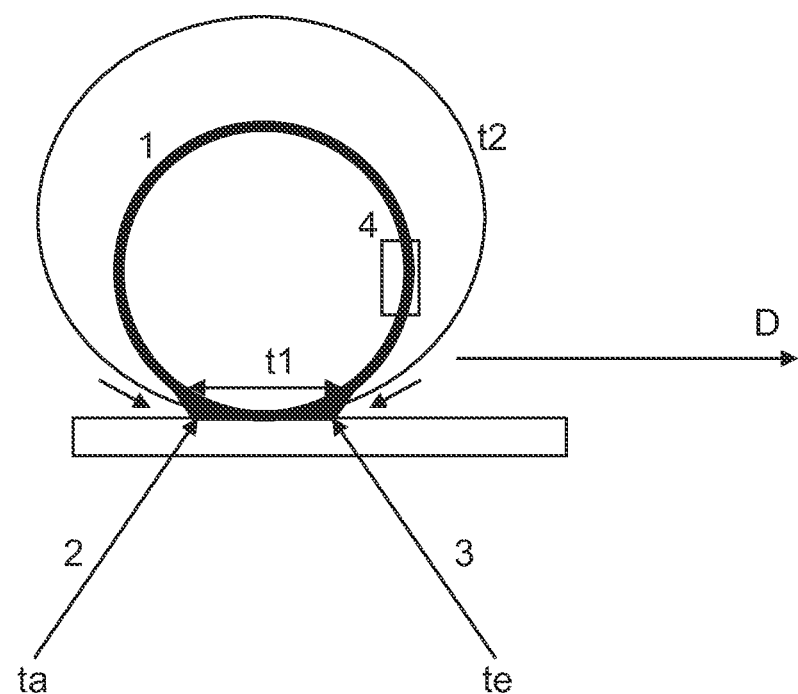
FIG. 1 is a schematic diagram showing a tire with a monitoring device, said tire contacting on a pavement.

FIG. 1 is a schematic diagram showing a tire 1, with a monitoring device 4 which contains a transmitter, a control unit and a signaling device, for example, a generator or an acceleration sensor, being mounted to said tire 1. The tire is contacting on the pavement with a circumferential section between points 2 and 3. As a general rule, this circumferential section is referred to as tire contact area or tire contact length.

If the vehicle moves in the direction of the arrow D, the monitoring device 4 with a generator contained therein reaches the beginning of the tire contact length in point 3. At this point in time $t_e$, a first voltage pulse is generated as a first signal. A little later, i.e., at the point in time $t_a$, the monitoring device 4 reaches the end of the tire contact length, i.e., point 2. There, the tire re-assumes its original shape which means that it is again deformed, with the result that the generator of the monitoring device 4 generates a second voltage pulse as a second signal. The time interval between a first voltage pulse and a second voltage pulse is $t_1$. With the tire making a further revolution, the monitoring device 4 re-arrives at the beginning of the tire contact length after the time interval $t_2$, with the result that a first voltage pulse is again generated.

In order to monitor the load of the vehicle tires, the time intervals $t_1$ determined for the individual vehicle tires or a value calculated therefrom are/is compared with a reference value. In the simplest case, in particular during straight-ahead driving, the reference value can be the value of the time interval $t_1$ of the vehicle tire arranged opposite on the other side of the vehicle. For example, the time intervals $t_1$ of the two front wheels can be compared with each other. If the time intervals of a left-hand vehicle tire are considerably different from the time intervals of the corresponding right-hand vehicle tire, this indicates an uneven loading of the vehicle. By evaluating the time intervals, it is, therefore, possible to obtain information about the load of the vehicle tires, wherein said information can be made available to a dynamic drive control system, for example, via a bus which is connected to a central unit which receives the radio signals from the monitoring devices 4.

The reference value with which the time intervals $t_1$ are compared can be defined in relation to the vehicle speed, particularly to determine an absolute value for the load of vehicle tires. For example, the vehicle speed can be determined by evaluating the time intervals $t_1$ between first and second voltage pulses and the time intervals $t_2$ between second and first voltage pulses. To be specific, the sum total of the two time intervals $t_1$ and $t_2$ corresponds to the time T for one revolution of the wheel. The tire contact length L can be approximately calculated as $L = 2\pi r\, t_1/T$, with r being the radius of the tire. A target value $L_{target}$ of the tire contact length can, therefore, be used to define a reference value R for the time intervals $t_1$ between first and second voltage pulses, for example, as $R = L_{target}(t_1+t_2)/2\pi r$, in relation to the speed.

In order to monitor the tire load, it is also possible to compare a quotient $t_1/t_2$ or $t_1/(t_1+t_2)$ with a predefined reference value, this being equivalent from a mathematical point of view. That is to say that the result is the same no matter whether a constant, for example, a reference value that is not predefined in relation to the speed is compared with such a quotient or whether a first time interval $t_1$ is compared with a reference value that is predefined in relation to the speed.

Preferably, the generator of the monitoring device 4 is a piezo-electric generator. Such generators can, for example, be adhered to the inner side of a tire in the form of a plate or a foil. When the tire is deformed, the generator is also deformed, with the result that a voltage pulse is generated.

Figure 2:
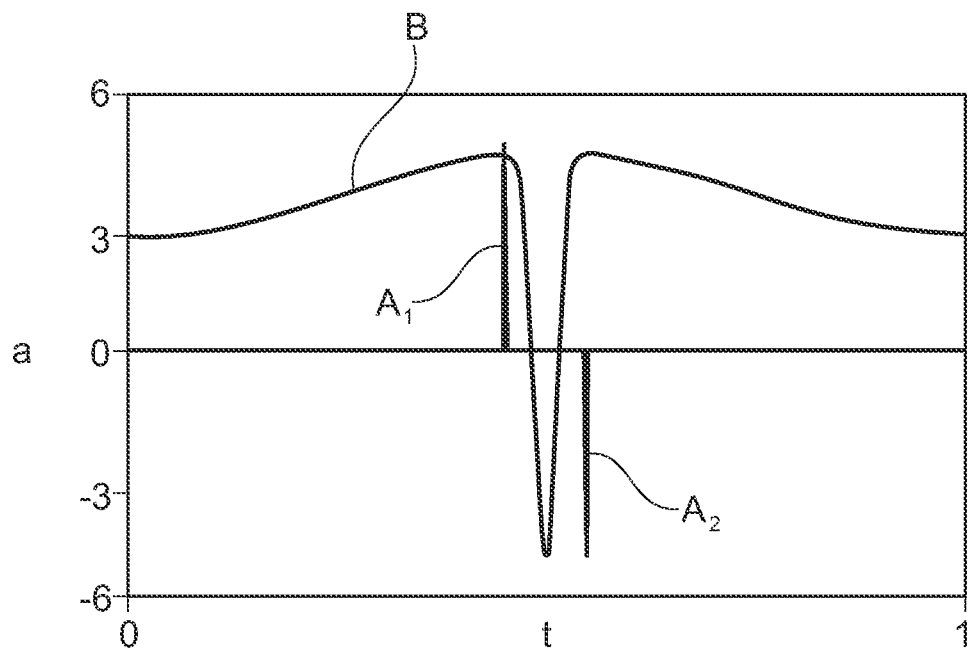
FIG. 2 is a schematic diagram showing the signal sequence of acceleration sensors during one revolution of the tire.

It is also possible to use a signaling device as an acceleration sensor in the stead of a generator. FIG. 2 is a schematic diagram showing the signal sequence of acceleration sensors during one revolution of a tire. The acceleration a is plotted in arbitrary units against the time t. A sensor for measuring the tangential acceleration provides a signal sequence which is characterized by two peaks A1, A2 when the tire contact length is reached and left. These two peaks have different signs and can, therefore, be used as first and second signals, respectively, without any problem.

A sensor for measuring the centrifugal acceleration provides the signal sequence designated with B in FIG. 2. First and second signals which reflect the reaching and leaving of the tire contact length, respectively, can, for example, be formed by deriving the signal sequence B, i.e., by differentiating the signal sequence B with respect to the time.

As a matter of principle, the tire contact length L can be used to obtain information about the tire inflation pressure. However, the method described can, most advantageously, be applied with monitoring devices which also contain a pressure sensor, most preferably also a temperature sensor, in addition to a transmitter, a control unit and a generator. In this manner, the method can be applied with conventional monitoring devices, such as they are, for example, known from WO 03/095245 A1. In addition, the reference value with which the time intervals $t_1$ between first and second voltage pulses are compared can, advantageously, be defined in relation to the tire inflation pressure.

In order to increase the reliability of the method, the time intervals can also be evaluated statistically. For example, a mean value from a predefined number of first time intervals or the sum total from a predefined number of successive first time intervals of a tire can be compared with the corresponding value of a tire that is arranged on the opposite side. In order to evaluate in relation to the speed, a quotient can be formed from first time intervals and second time intervals or from first time intervals and the sum total from first and second time intervals and be evaluated statistically by calculating a multitude of such quotients and forming a mean value.

The accuracy of the aforementioned method for determining the tire contact length can be increased by making use of a second signaling device which also generates a first signal each time it reaches the beginning of the circumferential section of the tire, which is contacting on the pavement, and generates a second signal each time it reaches the end of the circumferential section of the tire, which is contacting on the pavement. The first signals of the first signaling device and the second signaling device then succeed each other with a time delay, said time delay depending on the distance between the two signaling devices, said distance being measured in circumferential direction. The second signals of the two signaling devices also succeed each other with a time delay in corresponding manner. The vehicle speed and the tire contact length can be determined by evaluating the time delay between signals of the first signaling device and signals of the second signaling device.

To be specific, the vehicle speed v can be calculated from the distance s between the two signaling devices, said distance being measured in circumferential direction, and the time delay $\Delta t$ between signals of the first and the second signaling devices as $v=s/\Delta t \cdot L=v \cdot t_1$ is applicable to the tire contact length L, with $t_1$ standing for the time interval between first and second signals of a signaling device. The tire contact length $L=s \cdot t_1/\Delta t$ results from these two equations.

The target value $L_{target}$ of the tire contact length can, therefore, be used to calculate a reference value R for the time intervals $t_1$ between first and second voltage pulses, for example, as $R=L_{target} \cdot \Delta t/s$. If the time intervals between first and second signals of a signaling device exceed this threshold value, there is an excessive load of the vehicle tire, wherein said excessive load can be indicated to the user by means of a warning signal.

If use is made of two signaling devices that are arranged in a defined manner, it is, in addition, possible to determine the direction of rotation of the wheel. This can be used to distinguish between right-hand and left-hand wheels. For this reason, the allocation of a tire inflation pressure monitoring device to a wheel position on a vehicle can be facilitated.

In like manner, the frequency of rotation of the wheels can be used in combination with other sensor data available on the vehicle (ABS angle signals) to allocate a monitoring device to a wheel position.

REFERENCE SYMBOLS

1 Tire
2 Beginning of the tire contact length
3 End of the tire contact length
4 Monitoring device
D Arrow

What is claimed is:

1. A method for monitoring vehicle tire load, the tire having contact with pavement along a circumferential section during rotation, the method comprising:
   generating a first signal at a beginning of tire/pavement circumferential section contact using a monitoring/signaling device mounted to the tire;
   generating a second signal at an end of tire/pavement circumferential section contact using the monitoring/signaling device;
   measuring a time interval between the first and second signals;
   comparing the time intervals or a value calculated therefrom with a reference value;
   generating a warning signal if a difference detection in the comparison exceeds a predetermined value; and
   evaluating the time intervals to determine a tire lift off from the pavement and that, if a lift off is detected informing a dynamic drive control system of the lift off.

2. The method according to claim 1, wherein the signals are generated in response to a tire inflation pressure monitoring device with a pressure sensor for measuring the tire inflation pressure.

3. The method according to claim 1, wherein the reference value for a tire is defined in relation to the time intervals between successive signals of a tire on the opposite side of the vehicle.

4. The method according to claim 1, wherein the reference value is defined in relation to the vehicle speed.

5. The method according to claim 1, wherein a first sort of time intervals ($t_1$) between first and second signals and second sort of time intervals ($t_2$) between second and first signals are measured, wherein one sort of these time intervals or a value calculated therefrom is compared with a reference value and the other sort of these time intervals are used to define the reference value.

6. The method according to claim 1, wherein a measure for a contact area of the tire is calculated by evaluating the time intervals.

7. The method according to claim 1, wherein the monitoring/signaling device is a generator driven by flexion of the tire, said flexion occurring during vehicle operation.

8. The method according to claim 1, wherein the monitoring/signaling device is an acceleration sensor.

9. The method according to claim 1, further comprising using a second signaling device generating a first signal each time it reaches the beginning of the circumferential section of the tire, which is bearing on the pavement, and generates a second signal each time it reaches the end of the circumferential section of the tire, which is bearing on the pavement, and using a time delay between signals of the first signaling device and signals of the second signaling device to evaluate and define the reference value.

10. A method for monitoring vehicle tire load, the tire having contact with pavement along a circumferential section during rotation, the method comprising:
   generating a first signal at a beginning of tire/pavement circumferential section contact using a monitoring/signaling device mounted to the tire;
   generating a second signal at an end of tire/pavement circumferential section contact using the monitoring/signaling device;
   measuring a time interval between the first and second signals;
   comparing the time intervals or a value calculated therefrom with a reference value;
   generating a warning signal if a difference detection in the comparison exceeds a predetermined value;
   generating a third signal at a beginning of tire/pavement circumferential section contact using a second monitoring/signal device mounted to the tire a distance away in a circumferential direction from the first monitoring/signal device;
   generating a fourth signal at an end of tire/pavement circumferential section contact using the second monitoring/signaling device; and
   using a time delay between the first and third signals or the second and fourth signals to evaluate and define the reference value.

* * * * *